Dec. 18, 1956 K. S. DUNLAP ET AL 2,774,822

COMMUNICATION SYSTEM

Filed Aug. 2, 1952 5 Sheets-Sheet 1

INVENTORS K. S. DUNLAP
C. A. LOVELL
BY
ATTORNEY

INVENTORS: K. S. DUNLAP
C. A. LOVELL

BY [signature]

ATTORNEY

INVENTORS: K. S. DUNLAP
C. A. LOVELL
BY
ATTORNEY

COMMUNICATION SYSTEM

Filed Aug. 2, 1952 5 Sheets-Sheet 4

INVENTORS: K. S. DUNLAP
C. A. LOVELL
BY [signature]
ATTORNEY

INVENTORS: K. S. DUNLAP
C. A. LOVELL
BY [signature]
ATTORNEY

United States Patent Office 2,774,822

Patented Dec. 18, 1956

2,774,822

COMMUNICATION SYSTEM

Kermit S. Dunlap, Madison, and Clarence A. Lovell, Summit, N. J., assignors to Bell Telephone Laboratories, Incorporated, New York, N. Y., a corporation of New York Application August 2, 1952, Serial No. 302,371

4 Claims. (Cl. 179—18)

This invention relates to communication systems and more particularly to telephone systems wherein a number of subscribers may each independently be connected to a central office over a number of common trunks.

In the present-day telephone plant, a large portion of the cost of operation comprises the copper used in the subscribers' loops between the subscribers' instruments and the central office. Of the copper in the conduits about half is in service at any one time, and of that in service, the average amount in use during a busy hour is about five percent. Averaged over the entire day and for the entire copper in the conduits, the average use is of the order of one percent. It is therefore apparent that considerable effective savings are possible by the provision of means to increase the average use of the copper to some reasonably high value.

Such savings can be attained, in accordance with features of this invention, by the interposition of a satellite or slave office between the central office and a group of telephone subscribers, such as a hundred subscribers. The satellite office is a compact complete unit capable of being mounted in an apartment house, in a manhole, or even on a pole in less densely populated areas, for unattended operation. The satellite office provides access for the subscriber lines connected thereto to a smaller number of trunks going from the satellite office to the central office, where the control operations are performed. If a satellite office is unattended and completely controlled from the central office it can be positioned in apartment houses or in pole-mounted boxes, thereby reducing the cost of the telephone plant. In view of the large number of subscribers in a metropolitan area this saving in space-expense can be quite considerable.

It is one object of this invention to improve economically the telephone plant by increasing the average use of the copper, and particularly, the use of the copper presently employed in subscribers' loops.

Thus it is an object of this invention to enable a plurality of subscriber lines to be connected to a central office through an unattended satellite office remote from the central office and connected thereto by a smaller number of trunks.

Further, it is an object of this invention that all power, controls, registering, ringing, etc., be located in the central office and that the satellite office be actuated in its various operations by the central office.

It is a further object of this invention that the satellite office relay to the central office information denoting the condition at any time of any of the subscriber lines connected thereto.

It is a further object of this invention to provide means for controlling from the central office the switching of any subscriber line to any of the trunks extending between the central office and the satellite office.

In one specific embodiment of a telephone system, in accordance with this invention, the satellite office comprises a satellite switch having a group of relays for each trunk whereby that trunk may be connected to any one of the subscriber lines emanating from the satellite office, a single switch controller for operating any one of the groups of relays, and a line information scanner which scans the subscriber lines and transmits to the central office information as to the condition of any line, the information in this specific embodiment being whether the line is idle, requesting new service, or busy on a completed call. Each group of relays in the satellite switch includes relays for allowing the switch controller to affect the group of relays only when the particular talking trunk with which it is associated is being used and for rendering operation of the switch controller ineffectual after a call has been placed through on that particular trunk.

In this specific illustrative embodiment of this invention, the central office includes a switchboard to which the talking trunks are connected and through which the talking paths are set up in the central office, a service indicator which receives information from the line information scanner, and an operator's key shelf by which the operator can make a busy test on a particular subscriber line or actuate apparatus to find out what subscriber line is requesting service. The central office also includes in this specific embodiment of the invention an operator's satellite set which comprises a switch control transmitter for transmitting coded actuating signals to the switch controller and a line information recorder for registering the information received from the line information scanner.

It is a feature of this invention that a plurality of subscriber lines be connected to a satellite office which is entirely controlled by a remote central office, the subscribers being connected to that central office by a number of talking trunks extending between the two offices. Thus it is a feature of this invention that the satellite office may be unattended, receiving all power and control signals from the central office.

It is a further feature of this invention that the satellite office include a line information scanner whereby information as to the condition of any line and an identification of that line may be relayed to the central office at any time. Thus it is a feature of this invention that the central office include information receiving circuits for receiving that information and for identifying the particular subscriber line to which the information is pertinent.

It is a still further feature of this invention that the satellite office include a satellite switch associated with each trunk extending thereto from the central office and a single switch controller for connecting each trunk to any desired subscriber line emanating from the satellite office. More specifically, in accordance with this feature of the invention, the satellite switches each include means for preventing the switch controller affecting a particular satellite switch unless the trunk associated therewith is being used and also for preventing the controller from affecting that satellite switch after a call has been set up on the trunk through to one of the subscriber lines. Further in accordance with this feature of this invention, means are provided for holding the relay combination selected by the switch controller while a talking path is established through the satellite switch from the associated trunk to a subscriber line.

These and various other features of this invention can be fully understood from the following detailed description and the accompanying drawing, in which.

Figure 1:
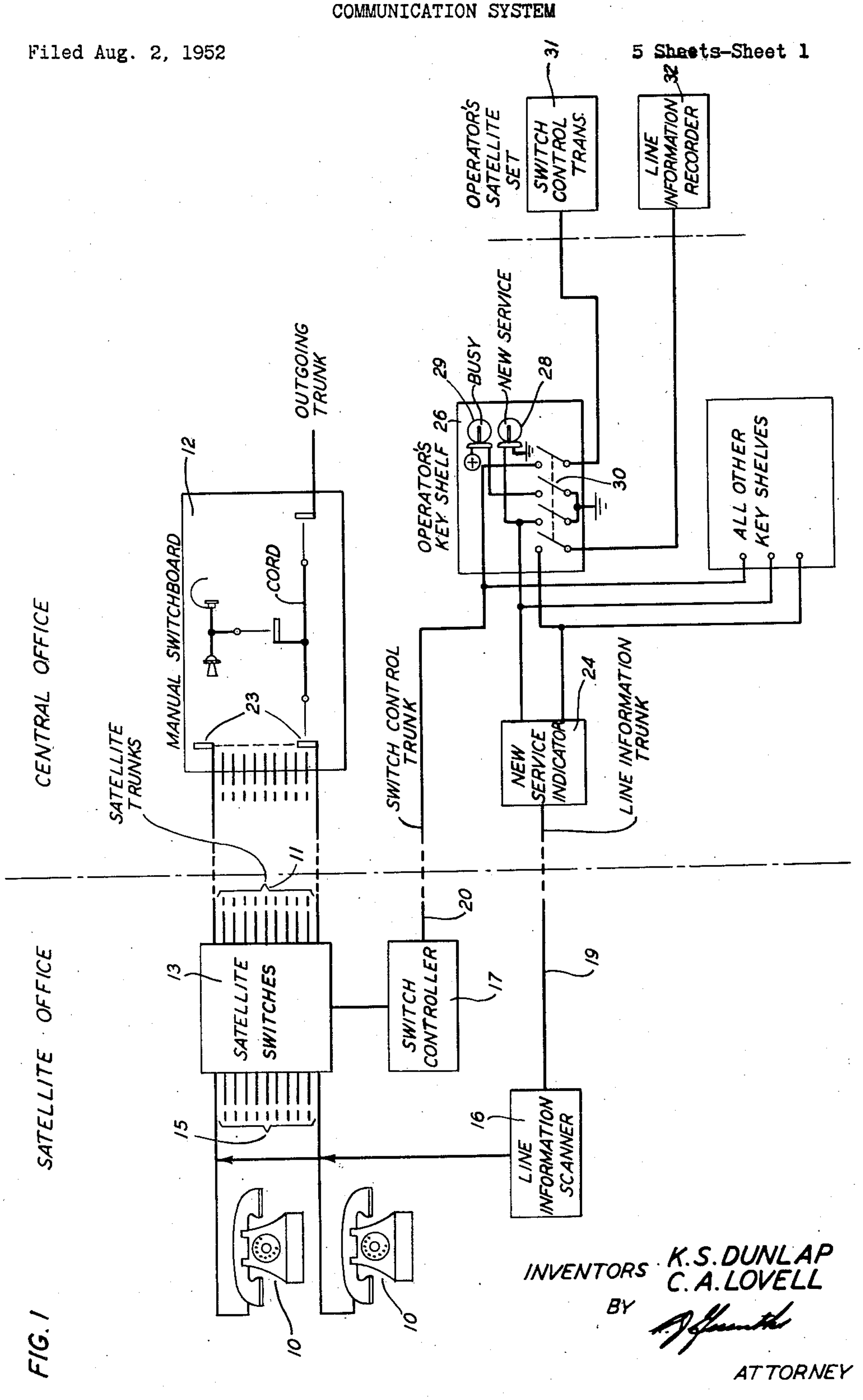
Fig. 1 is a block diagram representation of one specific embodiment of a telephone system in acordance with this invention.

Referring now to the drawing, Fig. 1 is a block diagram representation of one specific embodiment of our novel telephone system wherein a hundred subscriber instruments 10 are connected by ten satellite trunks 11 to a central office switchboard 12 through a satellite office. As clearly indicated in Fig. 1, the three basic components of this system are the satellite office, which is located adjacent the group of telephone subscribers being served, the central office switching network, through which normal telephone service is provided for the subscribers connected to the satellite station, and an operator's satellite set in the central office. Before describing specific circuitry and apparatus in accordance with this invention that may be incorporated into this system in particular embodiments thereof, it may be advantageous to describe the general operation of this system with refernce to the block diagram representation thereof in Fig. 1.

The satellite office comprises switching apparatus 13 through which any subscriber line 15 can be connected to any idle satellite trunk 11 without interference by any other connection existing through the switching apparatus 13, a line information scanner 16, and a switch controller 17. The line information scanner 16 continuously monitors or scans the subscriber lines 15 to relay information at any time, over line information trunk 19, to the central office as to the status of any line, i. e., whether it is busy, idle, or requesting service. The switch controller 17 receives the last two digits of the line directory number from the central office and translates them into coded switch marking voltages for proper operation of the satellite switching apparatus 13. The switch controller is connected to the central office by a switch control trunk 20.

In the central office, the satellite or voice trunks are terminated in multiple jacks 23 on the central office switchboard 12. While this switchboard is shown as a manual switchboard and the operation of our novel system, as described below, is in terms of manual operation, it is to be understood that our system is compatible with automatic switchboards and operations based on automatic rather than manual operations. It is believed, however, that it will simplify the disclosure and the description herein if the less complicated manual operation is described. The line information trunk or call wires 19 terminate in a new service indicator 24, further described below, and the output of this indicator 24 and the switch control trunk or call wires 20 are terminated at the key shelf 26 of all operators' positions. The operator's key shelf 26 comprises a new service lamp 28, a busy lamp 29, and a satellite key 30 by which connections are made to a switch control transmitter 31 and a line information recorder 32, which last two components comprise the operator's satellite set. This set may advantageously be shared by two operators to provide the most efficient use of the equipment.

When a subscriber lifts the handset to originate a call, the scanner 16 transmits to the new service indicator 24 information both indicating that service is desired and specifying the particular subscriber desiring the service. The new service indicator 24 in turn lights the service lamp 28 on the key shelf 26 at the operator's position. The operator, in response to this signal, throws the satellite key 30 thereby shorting the new service lamp 28, applying a ground to the busy lamp 29, connecting the line information recorder 32 to the new service indicator 24, and the switch control transmitter 31 to the switch controller 17. The code of the calling line is thus registered in the recorder 32, which may advantageously comprise vacuum tube counters which operate to display the calling number to the operator by means of lamps, as is known in the art.

Figure 4:
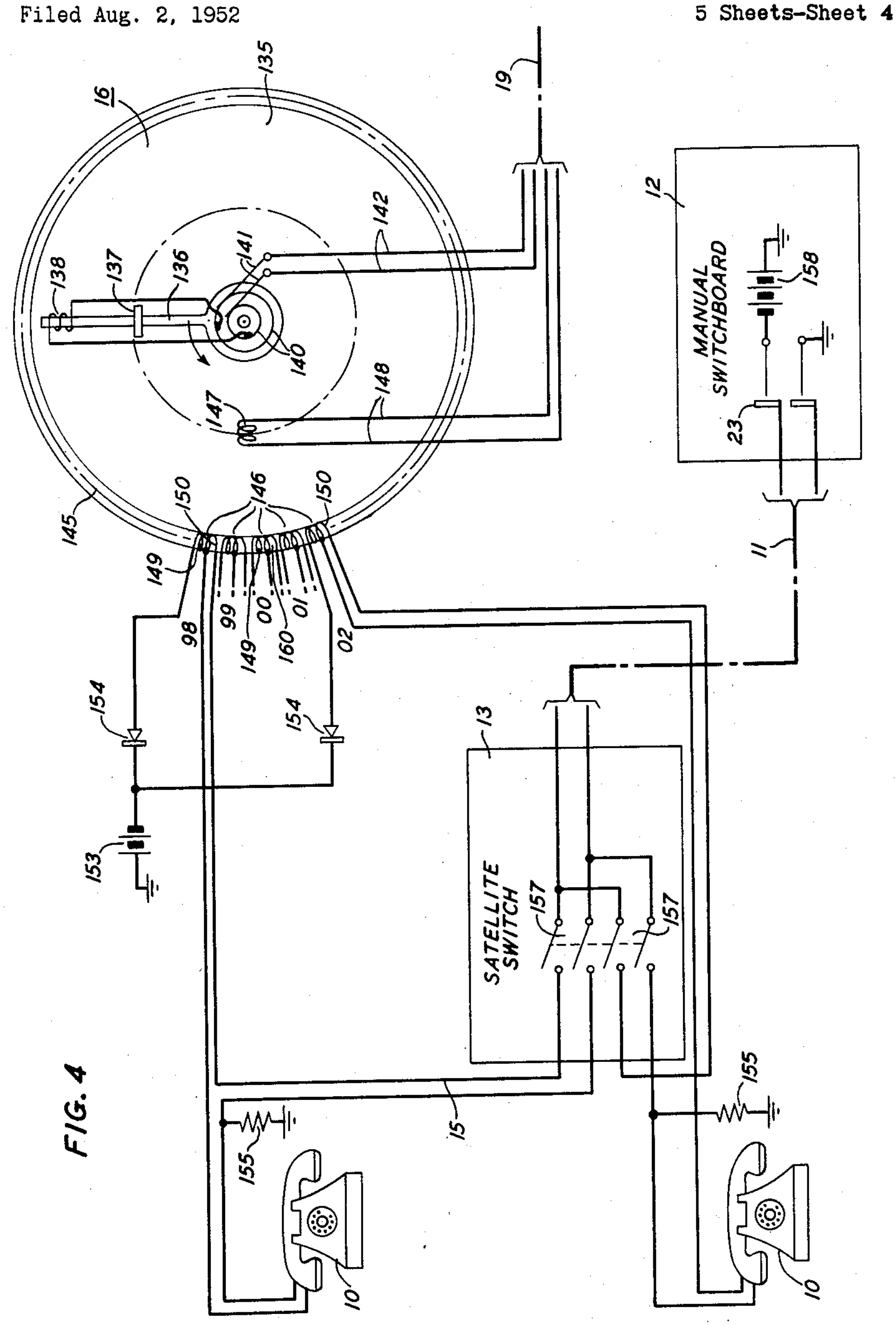
Fig. 4 is a schematic representation of one particular line information scanner that may be employed in the combination of this invention.
Figure 5:
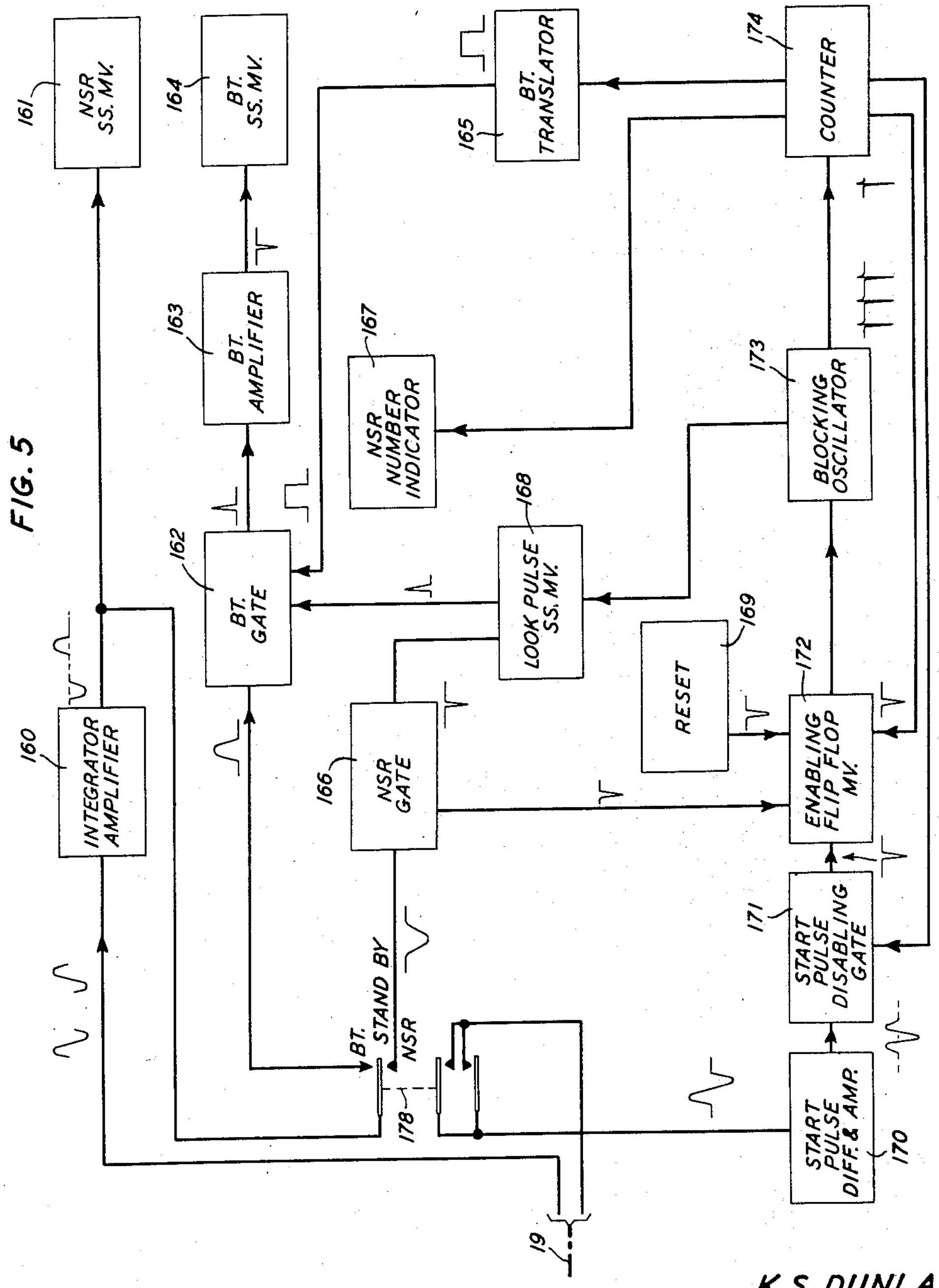
Fig. 5 is a block diagram of one particular new service indicator and line information recorder that may be employed in the combination of this invention.

One particular line information scanner 16, new service indicator 24 and line information recorder 32 that may advantageously be employed in our novel telephone system, in accordance with this invention, is disclosed in application Serial No. 302,372, filed August 2, 1952, by K. S. Dunlap and C. A. Lovell, now Patent 2,715,658, issued August 16, 1955. The line information scanner of that application is depicted in Fig. 4 and described subsequently herein; similarly the line information receiving and registering circuits which comprise the new service indicator and the line information recorder are depicted in Fig. 5 and described further below. Other scanners and line information systems can also advantageously be employed in this novel combination of this invention, two such other systems being disclosed in applications Serial No. 302,444 and Serial No. 302,445, both filed August 2, 1952, of F. T. Andrews, Jr., now Patents 2,715,657 and 2,715,656, respectively, both issued August 16, 1955.

The operator, after throwing the key 30, selects an idle cord and makes a satellite trunk busy test by touching the tip of the plug to the sleeve of the trunk with the talking key operated, as is usual procedure. When an idle trunk 11 is located, the operator's answer plug is inserted into its jack 23 and the switch control transmitter 31 operates the switch controller 17 thereby actuating the satellite switch 13 which connects the chosen trunk 11 to the calling subscriber line 15, the code of the calling subscriber having been set up automatically in the transmitter 31. The operator then receives the number of the called party from the calling subscriber and completes the call in the normal manner for manual operation of that central office. The satellite key is returned to normal by the operator when she locates an idle trunk 11 so that the key shelf 26 and control trunks 19 and 20 may be released for use on other calls.

When the terminating subscriber is in the satellite office, the operation of our novel system is as follows. The operator, after receiving the code of the called subscriber, sets up the last two digits of the called subscriber's code on the key board of the switch control transmitter 31. The operator closes the satellite key 30 for the called satellite office if the control trunks 19 and 20 to that office are idle. As a number of satellite offices may be connected to a single central office and each operator may have a satellite key for each office, the proper satellite office and proper satellite key may advantageously be identified by the first two digits of the called number. The operator's satellite set will then automatically make a busy test; if the called subscriber line is busy a busy lamp in the line information recorder 32 is lit and the switch control trunk not energized. The operator would then inform the calling party of the busy condition. If the called subscriber line is idle, the switch controller 17 is energized by the transmitter 31 with the subscriber line code.

The operation of the subscriber line busy test may advantageously comprise setting up in the central office the code of the particular subscriber line it is desired to test and then comparing that code with the subscriber line when it is scanned by the line information scanner 16. The particular scanner and busy test apparatus disclosed in the above-mentioned Dunlap-Lovell application may advantageously be employed and reference is again made to that application for a description of such apparatus.

After the operator has determined that the particular subscriber line being called is idle, a trunk busy test is made to locate an idle trunk between the offices, the test being made with the call plug of the cord circuit in the same manner as was done when a call was being originated by the satellite subscriber. The plug is then inserted into the idle satellite trunk, when found, and the trunk is automatically connected to the called subscriber line 15 as the subscriber code has been set up in the switch control transmitter. The operator releases the satellite key 30 and operates the ringing key. When the subscriber answers the ringing key is released and the call is complete.

Figure 2:
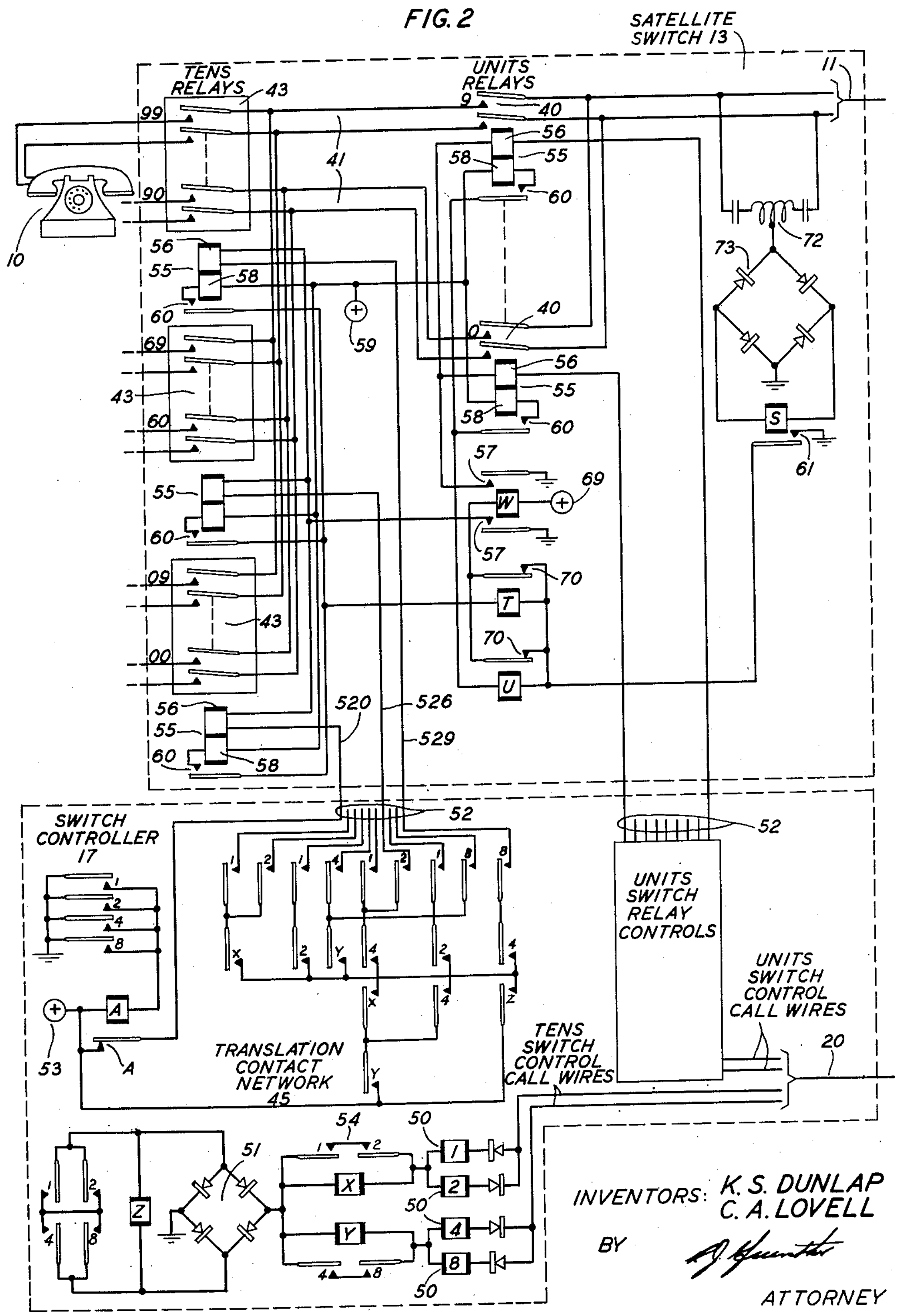
Fig. 2 is a circuit diagram of a portion of one of the satellite switches and of the switch controller in one specific illustrative embodiment of this invention.

Referring now to Fig. 2, the upper part of that figure is a partial schematic representation of a satellite switch that may advantageously be incorporated into a satellite telephone system in accordance with our invention. Each trunk 11 from the central office has connected to it ten units digit relays 40 from each of which two leads 41 extend. Ten tens digit relays 43 are in turn connected with a pair of contacts in each relay connected to each of the leads 41 from the units relays. While there are thus ten units digit relays and ten tens digit relays for each trunk, or a total of 200 relays for the ten trunks of this specific embodiment of this invention, relays and controls for only one trunk 11 are shown in Fig. 2 and only the units digit relays 40 for digits 0 and 9 and the tens digit relays 43 for digits 0, 6 and 9 are illustrated. Further only leads for subscribers identified by the codes 00, 09, 60, 69, 90 and 99 are shown. It is to be understood, of course, that the relays and connections to this switch for the remaining subscribers and also the other satellite switches associated with the other trunks may be identical in form and operation with the apparatus to be described.

The lower portion of Fig. 2 is a schematic representation of a switch controller that may advantageously be employed in this specific embodiment of this invention, there being one such switch controller to each satellite station. The switch controller is basically the unit in the satellite office that responds to signals transmitted from the central office and applies voltages to the proper switch operating leads to operate the units and tens digit relays, thereby connecting the trunk to the desired subscriber. In this specific embodiment the signals are transmitted from the central office in a modified binary-decimal code. Since the satellite switch operates on the decimal basis, the switch controller includes a translator, comprising the contact network 45.

Figure 3:
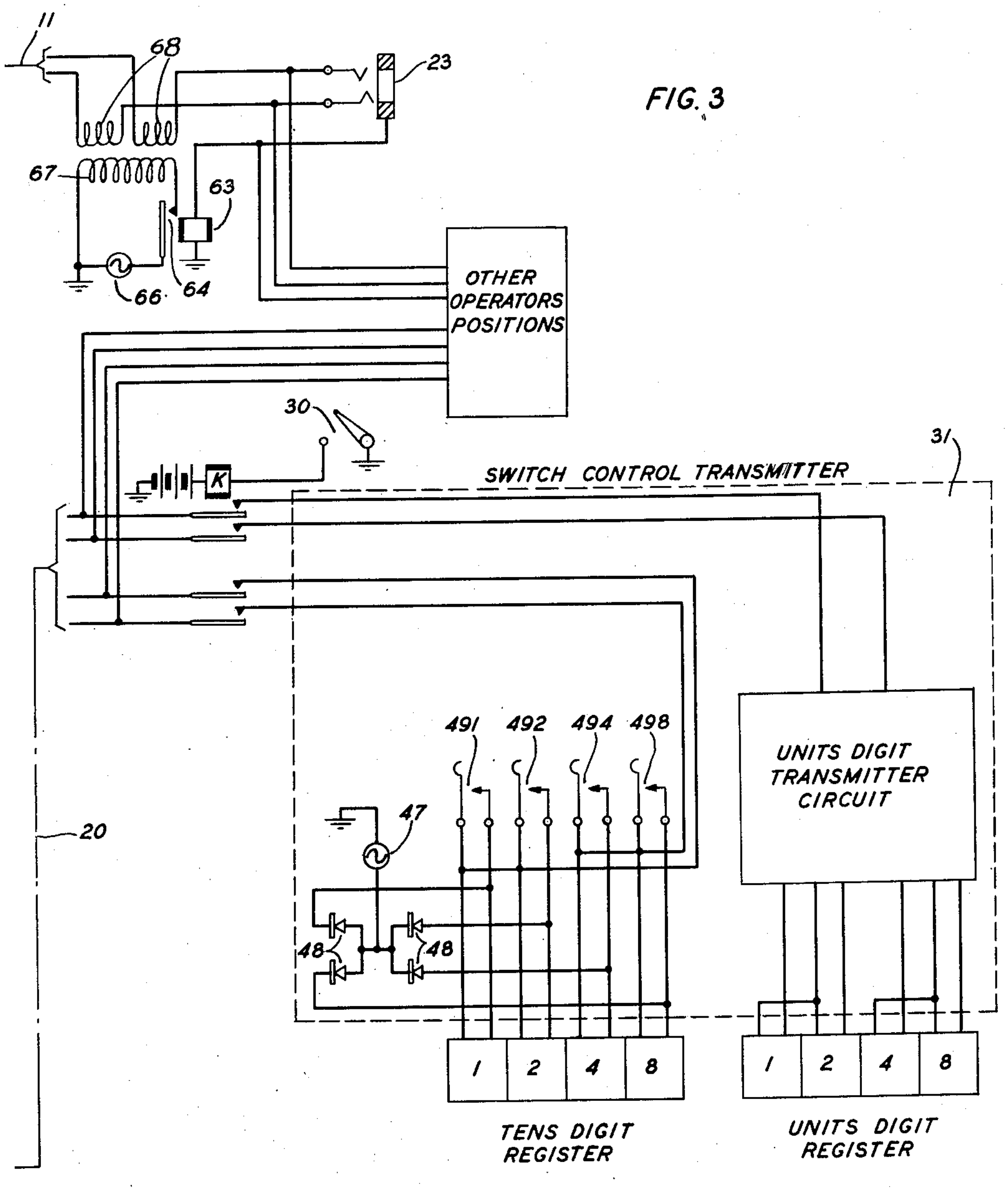
Fig. 3 is a circuit diagram of the central office equipment including a switch control transmitter and sleeve signal generator associated with the satellite switch and switch controller of Fig. 2 in accordance with one specific illustrative embodiment of this invention.

One specific illustrative embodiment of a switch control transmitter 31 is shown schematically in Fig. 3. The basic transmission system in this specific embodiment utilizes half-cycle waves to represent the binary digits 1, 2, 4 and 8. By using both polarities of half-cycle waves and a ground return, four binary digits can be transmitted per wire pair. Referring now to the drawing the basic transmission circuit comprises the grounded oscillator 47, four unidirectional current elements 48, and four operator keys 491, 492, 494 and 498 of the switch control transmitter and four poled relays 50 of the switch controller, the four poled relays being connected to ground and identified as relays 1, 2, 4 and 8. These relays 50 are advantageously copper sleeved to maintain operation over the complete cycle of the driving frequency. Thus by operating one of the four keys 49 in the switch control transmitter 31 the operator can transmit to the switch controller 17 half-cycle pulses which will activate a relay in the controller corresponding to that digit. In the drawing only the transmitter and controller for the tens digit relays have been fully shown, but it is to be understood that the circuits and apparatus may be duplicated to provide control for the units digit relays. The switch control transmitter 31 is connected to the switch controller 17 over the tens and units switch control trunks 20 by operation of the relay K when the operator throws the key 30 on the operator's key shelf 26.

Of the 16 numbers available from the four binary digits only 10 are required for marking the operating leads in a decimal relay group. In one specific embodiment of this invention, the binary codes are translated into the decimal code on a modified basis as given below. Decimal numbers 0 through 8 utilize usual normal binary equivalents, but the decimal number 9 is transmitter as the binary number 1100. The translating system disclosed in the drawing employs auxiliary relays $x$, $y$ and $z$ in addition to the poled relays 50(1), 50(2), 50(4) and 50(8) which correspond to the binary digits. These auxiliary relays are incorporated in this specific embodiment of this invention to minimize the number of back contacts in the translating network 45 as it is advantageous that glass-sealed contacts be employed. This is advantageous as it may be desirable that the satellite equipment be mounted in a manhole, directly on a pole, or in other places where it will be susceptible to dirt. By using glass-sealed relays the possibility of dirt getting onto the contacts is avoided, greater speed may be attained, and the satellite equipment may be more readily positioned in an unattended location in the vicinity of the subscribers connected thereto, thereby affecting some of the desired objects of this invention. However it is to be understood that other translating circuits may be employed and that other circuit groupings of contacts, not employing glass enclosed contacts or auxiliary relays may be utilized in the novel combinations of this invention.

In the specific illustrative embodiment disclosed relays $x$ and $y$ are two contact relays and relay $z$ is a single contact relay. Since relay $z$ must operate on either half wave or full wave sinusoidal signals, a full wave rectifier 51 is included ahead of relay $z$. In the network 54 for actuating the auxiliary relays $x$, $y$ and $z$ and in the translating network 45 the various contacts of the relays 50(1), 50(2), 50(4) and 50(8) are identified by the reference numerals 1, 2, 4 and 8, respectively, and the contacts of the auxiliary relays $x$, $y$ and $z$ by the reference characters $x$, $y$ and $z$, respectively. Thus no particular attempt has been made in the drawing to position each contact adjacent its actuating coil, as it is believed that the operation of the actuating network 54 and the translating network 45 can be readily understood from an inspection of the drawing if the various contacts comprising these networks are grouped together in the schematic representation illustrated.

The relationship between the operator's transmitter keyboard, the relays 50(1), (2), (4) and (8) and $x$, $y$ and $z$ operated in the switch controller, and the marking bus or operating lead 52 marked in the relay group of the satellite switch is given in the following table:

| Setting of Operator's Keyboard | Binary Number | Decimal Number | Relays Operated in Switch Controller | Operating Lead Marked |
|---|---|---|---|---|
| None | 0 | 0 | None | 520 |
| 1 | 1 | 1 | 1, $x$, $z$ | 521 |
| 2 | 10 | 2 | 2, $x$, $z$ | 522 |
| 1, 2 | 11 | 3 | 1, 2, $z$ | 523 |
| 4 | 100 | 4 | 4, $y$, $z$ | 524 |
| 4, 1 | 101 | 5 | 4, 1, $x$, $y$ | 525 |
| 4, 2 | 110 | 6 | 4, 2, $x$, $y$ | 526 |
| 4, 2, 1 | 111 | 7 | 4, 2, 1, $y$ | 527 |
| 8 | 1000 | 8 | 8, $y$, $z$ | 528 |
| 8, 4 | 1100 | 9 | 8, 4, $z$ | 529 |

An auxiliary relay A is included in the switch controller 17 to determine the application of a marking voltage to the 0 operating lead or bus 520. This relay is equipped with a permanent biasing flux to provide a normally closed single contact and is connected between the marking voltage source 53, which may advantageously be 48 volts and is supplied from the central office, and paralleled normally open contacts on each of the 1, 2, 4 and 8 relays 50. When any of these relays is operated, a ground is applied to the A relay and it operates to open the A contacts. When no relay 50 is operated a mark voltage is applied to the 0 operating lead 520. Thus if the code 0 is to be sent, the operator can send it, in this specific embodiment of this invention, merely by not pressing any of the keys on the transmitter keyboard while the satellite switch is in readiness for actuation, as described further below.

Turning now to the switch itself, an operating coil 55 is provided for each of the ten units relays and for each group of ten contacts of the tens relays. Each operating coil 55 comprises a double winding, the one winding being an operating winding 56 connected to one of the operating leads 52 and to ground through the normally open contacts 57 of relay W and the other winding being a hold winding 58 connected to a voltage source 59, advantageously supplied from the central office, and to ground through normally open contacts 60, each of which is controlled by one of the operating coils, and the normally open contacts 61 of a sleeve relay S. In the operation of the telephone system, when the operator in the central office chooses a particular trunk 11 a plug will be inserted into the terminating jack 23 of that trunk. This plug will cause current to flow to ground in the operating coil of a relay 63 in the central office thereby closing its normally open contacts 64, as seen in Fig. 3. Closing of contacts 64 closes a circuit including the sleeve signal generator 66 and the primary winding 67 of a simplex coil transformer, the secondary of which transformer comprises two windings 68 each in series in one wire of the trunk 11. The signal generator 66 will cause the relay S to remain actuated until the call on the trunk is completed and the operator pulls the plug from jack 23 allowing relay 63 to release.

The closing of contacts 61 of the sleeve relay S applies a ground to the winding of relay W connected to a voltage source 69, also advantageously supplied from the central office. This causes the W contacts 57 to close and apply a ground to one side of each of the operating windings 56 of the operating coils 55 for both the units relays 40 and the tens relays 43. A voltage is then placed on one operating lead 52 of the units groups of operating leads and one operating lead 52 of the tens group by the switch controller, as described above, and this voltage is applied to the other side of the operating windings 56 of the corresponding relays. The two relays thus chosen are operated, completing the talking path to the selected subscriber line in the satellite station. The control contacts 60 of the energized relays close and in turn energize the hold windings 58; in the drawing the control contacts 60 only have been shown for the three tens relays and the two units relays illustrated. The hold winding current flows to ground through the sleeve contacts 61 of the S relay operating a relay T in the tens group and a relay U in the units group, causing their normally closed contacts 70 to open. When these contacts 70 open, relay W is released thereby removing the ground from the operating windings 56 of the operating coils 55. The two hold windings 58 are energized, however, as long as the sleeve contact 61 is closed, i. e., as long as a sleeve signal is applied to the satellite trunk 11 being employed in the call by the central office.

When the particular connection from the satellite trunk to the desired satellite subscriber line is completed, the subsequent application of voltages to the operating leads will no longer operate other relays in the busy satellite switch as the relay W is prevented from operating by the open T and U relay contacts 70. Thus no ground can be applied to the other side of the operating windings 56. The operating leads of all trunk connectors are therefore advantageously multiplied and only one switch controller need be employed in each satellite station.

As pointed out above each satellite switch requires a sleeve relay S to apply a ground to various components of the switch on closing of its contacts 61. This ground, which is retained for the duration of the call to actuate the hold windings 58, is controlled by a supervisory signal from the central office. A transmission path for one binary digit per trunk is therefore necessary between the satellite and the central office. Since all trunks may be busy at one time, the transmission path, or paths, for these supervisory signals must be capable of simultaneous operation. The method illustrated in the drawing comprises an alternating current signal from the signal generator 66 located above the voice band and transmitted on the talking trunk 11 itself, the signal being placed on the trunk by means of a simplex coil when the relay 63 operates and being removed from trunk at the satellite by a bridged, tuned circuit 72. Relay S is then operated through a full wave rectifier 73. However, in accordance with this invention the supervisory signal for operation and release of the S relay can be transmitted over a third wire of each trunk 11; if a third wire is employed it may advantageously be shared by two trunks by appropriate choice of rectifiers so that two binary digits are transmitted per wire by using both polarities of half-cycle waves, as described above for transmission of the switch control signals. Or if the number of operating satellites emanating from a central office is large, the sleeve signal can be advantageously transmitted on the power cable or on a separate wire pair on a frequency division basis using vibrating reed selectors as detectors. One reed selector would be required per trunk 11. The operation of the trunk relay 63 in the central office would then connect a signal of the assigned frequency to the common transmission path.

Turning now to Fig. 4, there is depicted the specific line information scanner of the above-mentioned Dunlap-Lovell application; it is to be understood, however, that other line information scanners may be employed in the combination of this invention. As there seen, the line information scanner 16 may advantageously comprise, in accordance with this invention, an electromagnetic rotary scanner 135 having a rotating arm 136 with a permanent magnet 137 attached thereto and a scanning coil 138 located at the end thereof. The scanning coil 138 is connected by slip rings 140 and contacts 141 to two lines 142 of the line information trunk 19 and through the trunk 19 to the integrator amplifier of the new service indicator 24, shown in Fig. 5. Positioned on the rim 145 of the rotary scanner 135 are, in this specific embodiment, a hundred indicating coils 146, each connected to a separate subscriber. A start coil 147 is positioned within the scanner 135 and advantageously so as to be swept by the rotating arm 136 between the indicating coils 146 for the subscriber lines identified by the codes 99 and 00. The start coil 147 is connected, through a second pair of lines 148 of the line information trunk 19, to the start pulse differentiator and amplifier of the new service indicator 24, as shown in Fig. 5. The subscriber coils 146 are each composed of two windings, a new service request winding 149, and a busy winding 150, as explained further below.

Advantageously, the rotating arm 136 may be driven by a $\frac{1}{250}$ horsepower motor at a speed of 1800 revolutions per minute, and the start coil 147 is mounted on an adjustable bracket inside the ring of subscriber coils 146 so as to be swept by the permanent magnet 137 once during each revolution of the arm 136. In this means, a short sinusoidal wave is induced in the start coil 147 once every revolution just before the scanning coil reaches the first subscriber coil, connected to subscriber 00. This voltage, which shall be referred to subsequently as the start pulse, is used to start a cycle of operation in the information receiving equipment in the central office in synchronism with the scanner information, as further explained below.

The operation of the scanner and the circuit advantageously employed therewith can be best understood by reference to the functions performed by this specific embodiment of the invention. When a telephone subscriber, such as that represented by the code number 08 removes the receiver of his instrument 10 from its hook, a circuit is completed comprising the battery 153, which advantageously supplies a potential of 18 volts, the unidirectional current device 154, which may advantageously be a varistor or semi-conductor device, the new service request winding 149, the instrument 10, and a resistance 155, which may advantageously be 1200 ohms. The current which is flowing in this circuit in flowing through the winding 149 sets up a field which induces in the scanning coil 138 a cycle of a negative sine wave. This cycle or pulse is transmitted, by the slip rings 140, contacts 141, lines 142 and trunk 19, to the new service indicator 24.

When the subscriber is busy on an incoming or outgoing call, his relay contacts 40 and 43 shown schematically as contacts 157 of the satellite switch 13 are closed, and current will flow in the circuit comprising the voltage supply 158, which may advantageously be 48 volts, the busy winding 150, and the instrument 10. The varistor 154 is rendered non-conducting because of the change of polarity across it as the voltage supply 158 is of a higher potential than the voltage supply 153. The current now flowing in the busy winding 150 of the coil 146 sets up a field which is opposite in polarity to that set up by the winding 149 for a new service request. A sinusoidal pulse of positive polarity is therefore induced in the scanning coil 138 as it sweeps past the coil 146, so that a pulse of opposite sign is transmitted by the trunk 19 to the new service indicator when the line is busy. Thus the same scanning and transmitting apparatus is employed to indicate whether a subscriber is requesting service or is busy, a sinusoidal pulse of one polarity being indicative of one state and a sinusoidal pulse of the opposite polarity being indicative of the other state. The polarity of a full wave pulse can be considered to be the polarity of the first half cycle.

Thus, three different pulses are transmitted from the scanner at the satellite office to the information receiving equipment at the central office. These pulses are the start pulse, which is generated by the start coil 147 and sent over one call wire of the line information trunk 19, and a busy pulse and a new service request pulse, the last two being one cycle sine waves of opposite polarity generated by one of the indicating coils 146 and sent over another call wire of the trunk 19. The information receiving equipment must identify these pulses and take appropriate action on receiving them. This action comprises identifying the subscriber requesting service or the completion of a busy test on a particular subscriber line.

Referring now to Fig. 5, there is shown a block diagram of one particular information receiving equipment that may be employed in the combination of this invention, the equipment being further disclosed in the above-mentioned Dunlap-Lovell application. Certain elements of this equipment are common to both the functions of a busy test and a new service request indication. In the following table, the elements are listed, those elements being employed only in the busy test being identified as B. T., those employed only in the new service request indication as N. S. R., and those common to both functions as Com. All the equipment but the integrator amplifier and new service request single shot multivibrator is advantageously common to several satellites.

| Element | Function |
|---|---|
| Integrator Amplifier 160 | Com |
| New Service Request Single Shot Multivibrator 161 | NSR |
| Busy Test Gate 162 | BT |
| Busy Test Amplifier 163 | BT |
| Busy Test Single Shot Multivibrator 164 | BT |
| Busy Test Translator 165 | BT |
| New Service Request Gate 166 | NSR |
| New Service Number Indicator 167 | NSR |
| Look Pulse Single Shot Multivibrator 168 | Com |
| Reset 169 | Com |
| Start Pulse Differentiator and Amplifier 170 | Com |
| Start Pulse Disabling Gate 171 | NSR |
| Enabling Flip-Flop Multivibrator 172 | Com |
| Blocking Oscillator 173 | Com |
| Counter 174 | Com |

The functioning of this equipment can best be understood by a description of its operation for each of its functions. Considering the new service request function first, when a subscriber removes the receiver of his telephone 10 from its cradle, a field is set up in his subscriber coil 146 positioned on the rim of the scanner 135 which causes a one cycle sine wave pulse to be generated in the scanning coil 138 when the rotating arm 136 sweeps by the coil 146, as described above. This sinusoidal pulse, which we may assume to be negative, i. e., the first half cycle is negative and when integrated the result is a negative half cycle pulse, is transmitted over trunk 19 to the integrator amplifier 160 of the new service indicator 24 associated with that particular satellite, where it is both integrated and amplified. The output of the amplifier, is a negative pulse indicating a new service request, trips the new service request single shot multivibrator 161 advantageously causing a neon bulb to light, thereby indicating to the operator what satellite office is requesting service.

The operator will then throw a switch 178 to the new service request position, thereby connecting the integrator amplifier 160 to an idle line information receiving circuit and also applying the start pulse from the scanner to the start pulse differentiator and amplifier 170. The differentiation and amplification of the start pulse produces a sharp negative signal which is fed through an open start pulse disabling gate 171 to the enabling flip-flop multivibrator 172. Until this time the flip-flop multivibrator 172 has been in a condition cutting off the blocking oscillator 173. When the negative pulse flips the enabling flip-flop 172, the blocking oscillator 173 is caused to oscillate with a period between pulses equal to the time slot assigned to each satellite subscriber.

The output of the blocking oscillator has two functions; it causes a modified binary counter 174 to count each pulse from the oscillator, and it also trips the "look" pulse single shot multivibrator 168 with each pulse from the oscillator. The "look" pulse multivibrator has a natural period of one-half the period of the blocking oscillator and is used as a source of a sharp pulse placed in the center of each subscriber's time slot. A negative look pulse from the look pulse multivibrator 168 opens the new service request gate 166 for a short time in the center of each subscriber's time slot. If no signal, or if a positive signal, representing a busy line, is arriving at the new service request gate 166 from the integrator amplifier 160, there is no output from the new service request gate 166.

However, in the time-slot occupied by the subscriber requesting service, a large negative pulse will arrive at the new service request gate 166 from the integrator amplifier 160. When that pulse is present, a negative pulse is fed through the new service request gate 166 when it is opened by the look pulse to the enabling flip-flop 172, which flips it back to the off position. This stops the blocking oscillator 173 and the counter 174 remains in a position indicating the count of the time-slot of the subscriber requesting service, i. e., indicating the number of pulses from the oscillator 173 that have been counted, at the rate of one pulse for each time slot, since the start pulse. This count can be read, in the code employed, on the new service indicator 167, which advantageously consists of neon bulbs or the like connected to the plate circuits in the counter.

When the revolving arm 136 in the scanner 135 again passes the start coil 147, another start pulse is generated and transmitted to the central office. In order to prevent the oscillator 173 starting again and thus advancing the counter 174 by the same number as appeared on it before, a start pulse disabling gate 171 is interposed between the start pulse differentiator and amplifier 170 and the enabling flip-flop multivibrator 172 and permits the start pulse to pass through it only when the counter is in its zero position. A reset circuit, which may advantageously be activated when the switch 178 is returned to its open position, enables the counter to count up to the end of its complete cycle and then turn itself off.

If the operator wishes to determine whether a particular subscriber line 15 is busy before placing a call through to it on one of the trunks 11, he first sets up the number of the line to be tested in the busy test translator 165 in the particular code of the equipment, which may advantageously be the modified binary code described in the above-mentioned application. This will cause a positive voltage to appear at the output of the translator 165 throughout the tested subscriber's time slot when the counter is running. The operator then connects the switch 178 for a busy test. This allows a positive busy pulse, which has been integrated and amplified, to be applied to the busy test gate 162 and also again applies the start pulse to the start pulse differentiator and amplifier 170. The start pulse will start the oscillator 173 and counter 174 running, as described above. For a busy test, however, no signal appears to stop the oscillator until the counter has completed its cycle, at which time it shuts off.

As noted above, a positive voltage appears at the output of the translator 165 for the particular code set up in it when the counter has reached that time slot. Further in the center of every time slot, as before, a sharp look pulse appears from the multivibrator 168. Both the positive pulse from the translator 165 and the positive pulse from the multivibrator 168 appear at the busy test gate 162. If there is any signal at the output of the integrator amplifier 160, it appears at a third input to the gate 162. This gate 162 is so designed that a positive pulse appears at its output only when all three inputs are present. This pulse from gate 162 is advantageously amplified by amplifier 163 and applied to a single shot multivibrator 164, which activates an indicator, such as a neon lamp. This lamp will appear to stay on until the code in translator 165 is changed, the busy test equipment removed by opening switch 178, or the tested subscriber line ceases to be busy.

While gates, circuits, amplifiers, multivibrators, etc., are circuit components well known in the art and any of the various known components may be employed in the circuit of Fig. 5, one preferred specific illustrative embodiment of these groups of circuits is disclosed in the above-mentioned Dunlap-Lovell application Serial No. 302,372.

It is to be understood that the above-described arrangements are but illustrative of the application of the principles of this invention. Numerous other arrangements may be made by those skilled in the art without departing from the spirit and scope of the invention.

What is claimed is:

1. A telephone system comprising a plurality of subscriber telephones, a satellite office, a subscriber line connecting each of said telephones to said satellite office, a central office remote from said satellite office, a plurality of trunks connecting said satellite office to said central office, a plurality of switching means within said satellite office for connecting said trunks to any of said subscriber lines, one of said switching means being associated with each of said trunks, switch controller means within said satellite office common to all of said switching means for controlling the operation of said switching means, and transmitting means within said central office for sending to said switch controller means coded information corresponding to the code designation of a particular one of said subscriber lines, said switch controller means comprising a plurality of marking buses and means for receiving said coded information from said central office and for translating said information to apply marking potentials to particular ones of said buses in accordance with said information, and each of said switching means comprising a plurality of relays, operating coils for actuating each of said relays, each of said coils comprising an operating winding and a hold winding, means for completing a plurality of circuits each including a certain operating winding of one of said switching means and said marking buses common to all of said switching means on choice in said central office of the trunk associated with said one switching means to actuate the operating windings of certain of said relays dependent on the potentials applied to said marking buses by said switch controller, means for passing current through said hold windings of said relays common to said certain operating windings on operation of said certain operating windings, and means for preventing subsequent operation of said operating windings while said hold windings are being actuated.

2. A telephone system in accordance with claim 1 wherein said means for completing a plurality of circuits each including an operating winding of one of said switching means and said marking buses common to all of said switching means includes a first relay actuated on the choice in said central office of the trunk associated with said switching means, normally open contacts on said first relay closed on actuation of said first relay, one of said contacts being connected to ground, a second relay, a source of potential, the operating winding of said second relay being connected to the other of said contacts and to said source of potential for actuation on the closing of said contacts of said first relay, and normally open contacts closed on actuation of said second relay, one of said contacts of said second relay being connected to ground and the other of said contacts of said second relay being connected to one side of said operating windings, the other side of said operating windings being connected to one of said marking buses.

3. A telephone system in accordance with claim 1 wherein said means for receiving and translating said coded information comprises a second plurality of relays, the contacts of said relays being arranged in a translating network between a source of marking potential and said marking buses and being normally open, and a relay having normally closed contacts connected directly between said source of marking potential and one of said marking buses, said relay being actuated on the closing of any one of said second plurality of relays whereby a marking pulse is applied to said one marking bus through said normally closed contacts only on the absence of coded information from said central office.

4. A telephone system comprising a plurality of subscriber telephones, a satellite office, a subscriber line connecting each of said telephones to said satellite office, a central office remote from said satellite office, a plurality of trunks connecting said satellite office to said central office, a plurality of switching means within said satellite office for connecting said trunks to any of said subscriber lines, one of said switching means being associated with each of said trunks, switch controller means within said satellite office common to all of said switching means for controlling the operation of said switching means, transmitting means within said central office for sending to said switch controller means coded information corresponding to the code designation of a particular one of said subscriber lines, said switch controller means comprising a plurality of marking buses, means for receiving said coded information from said central office and for translating said information to apply marking potentials to particular ones of said buses in accordance with said information, each of said switching means comprising a plurality of relays for connecting said trunk associated with said switching means to any of said subscriber lines, operating coils for each of said relays, said operating coils comprising an operating winding and a hold winding, a first relay actuated on choice of said associated trunk in said central office, a pair of normally open contacts closed on actuation of said first relay, one of said contacts being connected to ground, a second relay actuated on the operation of said first relay to apply ground to one side of each of said operating windings, the other side of each of said operating windings being connected to a particular one of said marking buses, contact means associated with each of said plurality of relays and actuated by the operating winding thereof for allowing current to flow through the hold winding of the relay actuating said contact means, and relay means for releasing said second relay on the closing of one of said contact means to remove the ground from said operating windings.

References Cited in the file of this patent

UNITED STATES PATENTS

| | | |
|---|---|---|
| 1,813,913 | Clokey et al. | July 14, 1931 |
| 2,532,097 | Hersey | Nov. 28, 1950 |
| 2,555,245 | Powell | May 29, 1951 |
| 2,594,923 | Hersey et al. | Apr. 29, 1952 |